Patented Nov. 24, 1936

2,062,064

UNITED STATES PATENT OFFICE 2,062,064

MONOCALCIUM PHOSPHATE

William H. Knox, Jr., and Robert T. Cochran, Nashville, Tenn., assignors to Victor Chemical Works, a corporation of Illinois Application March 4, 1935, Serial No. 9,300

9 Claims. (Cl. 23—109)

This invention relates to improved monocalcium phosphate and a method of producing the same.

Two types of monocalcium phosphate are known to the trade at the present time. The first of these is the common commercial product produced by manufacture of the material in the ordinary way. The second product is spray-dried monocalcium phosphate. The spray-dried material possesses many advantages over the common dry-milled material, but it has certain disadvantages, particularly in being more hygroscopic. The present product retains the advantages of the spray-dried material, and at the same time is less hygroscopic than the spray-dried products.

In accordance with the present invention, monocalcium phosphate is produced by reacting a lime base with phosphoric acid and passing the hot moist reaction mass of monocalcium phosphate into a multiple cage type disintegrator revolving at high speed. Under these conditions, the tiny crystals are kept from agglomerating into larger granules, the hot moist air present promotes the reaction and permits unreacted phosphoric acid and lime to react more completely, and at the same time a product is produced of highly uniform size, although of irregular structure. Rather surprisingly the finished product is substantially free from sharp corners, nearly all of the corners of the particles being rounded off in the process. The resulting product is much more free-flowing than the dry-milled article.

Figure 1:
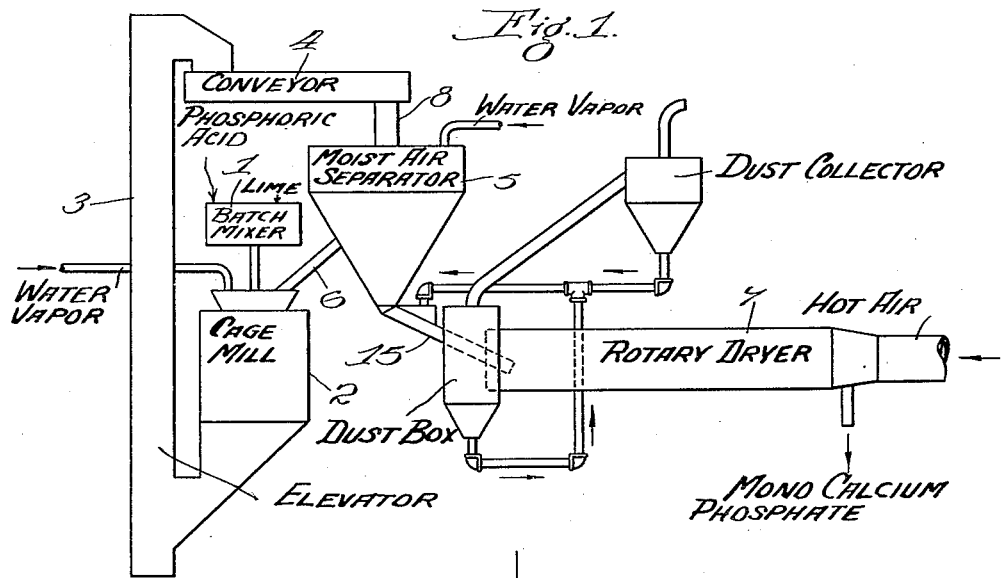
Figure 2:
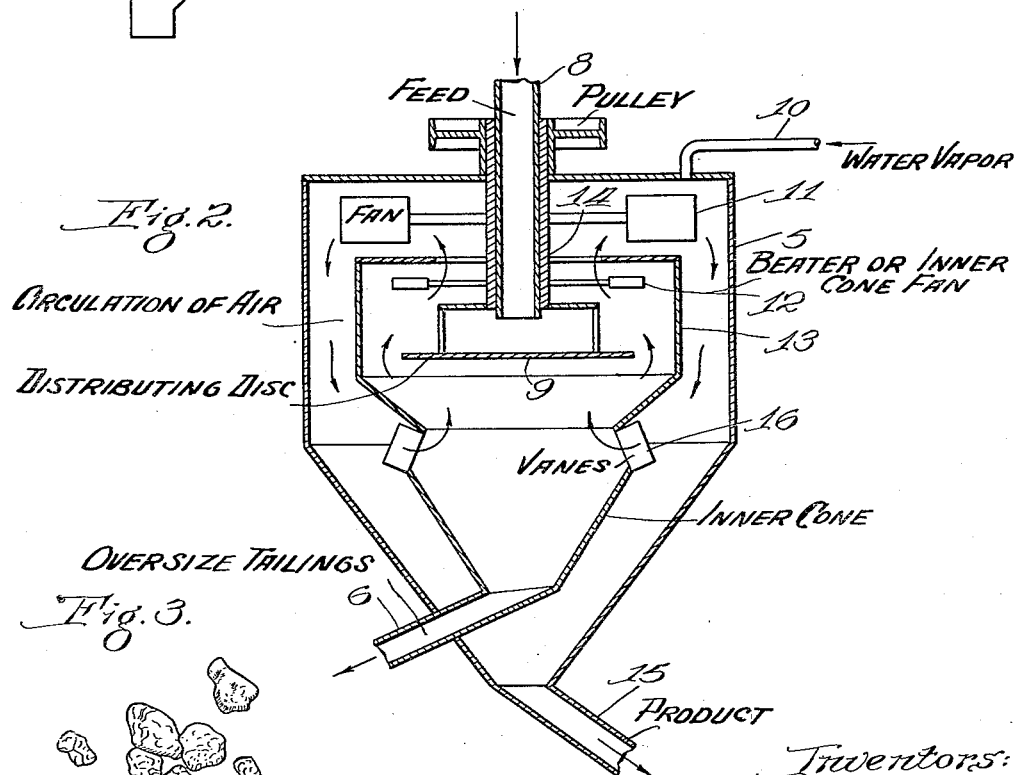
Figure 3:

The drawing illustrates diagrammatically an apparatus for carrying out the process, Fig. 1 being a broken diagrammatic elevation of an apparatus, and Fig. 2 being a broken sectional elevation of the moist air separator shown in Fig. 1. Fig. 3 illustrates an enlarged group of crystals of the new product.

In practicing the invention substantially pure lime (CaO) or lime hydrate (Ca(OH)$_2$) is treated in a batch mixing tub 1 with substantially the theoretical amount or somewhat less of 45–55° Bé. (preferably 50–55° Bé.) gravity strength phosphoric acid, depending on the neutralizing strength desired in the product. This variation in the proportion of acid does not produce free acid in the product at the higher proportions, as is the case in normal commercial processes. The mixing is continued vigorously until the heat of the reaction drives off a large proportion of the moisture as vapor, and the reaction mass becomes a friable lumpy or granular material preferably containing from 8–12% of moisture. The moisture content may go as low as 5% however.

This moist product, instead of being dried as in the ordinary commercial procedure, is passed while still hot and moist through a disintegrator 2 of the revolving cage type where the individual crystal masses of monocalcium phosphate are substantially separated from each other before they have had an opportunity to cement themselves together into an agglomerate lump or large granule.

Without permitting any intermediate drying action, the material discharged from the cage mill is taken in the elevator 3 and on the conveyor 4 to a mechanical air separator 5 equipped with an internal air circulating system wherein hot moist air is circulated through the material and separates the coarse lumps from the fine granules. The coarse material, comprising many large agglomerated granules, is returned to the cage mill through the line 6, while the small particles are discharged into a rotary drier 7, countercurrent to a stream of warm, relatively dry air, and are therein dried to a moisture content of less than 0.5% and preferably below 0.25%. The relative volume, velocity, and temperature of the air is regulated so as not to cause dehydration of the crystalline monocalcium phosphate. It is preferred that the air temperature be in the range from 200–300° C.

The cage mill, conveying equipment, and air separator are fully insulated against heat losses in order to preserve the reaction temperature and prevent the condensation of moisture from the nearly saturated air maintained in this stage of the process.

As shown in Fig. 2, the material is fed into the moist air separator 5 through the pipe 8 onto the distributing disk 9. Water vapor to maintain the moisture content enters the separator through the pipe 10. A fan 11 is provided in the upper part of the separator, and a beater fan or inner cone fan 12 is provided within the inner housing 13. The fans are so shaped and operated that the circulation of air is as illustrated by the arrows in Fig. 2. The large particles leaving the revolving distributing disk fall against the currents of air and pass out through the line 6. The small particles, however, are carried by the air currents up through the openings 14 in the housing 13 and are distributed by the upper fan 11. The particles then fall along the outer part of the separator and pass into the outlet 15 leading to the rotary drier 7. The air recirculates through the vanes 16.

The reaction mass discharged from the batch tub normally has a temperature of from 70° to 120° C., and generally from 75–110° C., which is generated as a result of the heat of reaction between the lime base and the phosphoric acid. Inasmuch as it is practically impossible to secure a complete reaction in the mixing tub, this temperature is preserved as long as possible in the subsequent steps of disintegration and separation in order that the reaction may proceed to its maximum, and at the same time permit the crystallization of the monocalcium phosphate to proceed at a slow rate. The high temperature is likewise desirable in order that as high a vapor pressure of water as possible may be maintained. It is preferred that the vapor pressure be as high as 200 millimeters, and preferably the humidity is maintained at 90% or higher. The high humidity apparently helps to slow down the rate of crystallization and prevents the bonding together of large numbers of individual crystals into large granules. This division of individual particles not only avoids later intensive milling of the dried product with the resultant production of large amounts of extremely fine particles, but also permits a more intimate contact of the normally unreacted lime and acid, while the material is still moist and hot, thus insuring a product of lower dicalcium phosphate and free acid content than is normally obtained. As a result it is possible to use a lower excess of lime than is normally the case, and to obtain a monocalcium phosphate of high neutralizing value.

While the exact nature of the changes which take place during the wet disintegration and moist air separation of monocalcium phosphate are not fully understood, it appears that the crystal masses are formed with more or less plastic surfaces and are easily pulled apart in the cage type disintegrator without crushing or shattering the individual masses, and that in the moist air separator the surfaces of the crystal masses are sufficiently wet to allow a slight force of surface tension to cause a rounding of the corners of the individual masses, thus producing a product the particles of which are more or less solid hard masses of irregular shape having substantially none of the physical characteristics of a crushed or milled product.

Screen analysis of the product shows a substantial difference from the normal commercial product in that the intermediately fine particles are substantially increased in amount while the number of particles below 5 microns in diameter are greatly decreased. Typical screen analysis shows approximately the following range of particle sizes:

| | |
|---|---|
| On 100 mesh | Trace |
| On 200 mesh | 16 to 29% |
| On 325 mesh | 20 to 25% |
| Thru 325 mesh | 55 to 65% |

The 55 to 65% of material finer than 325 mesh on microscopic examination shows approximately the following range of particle sizes.

| | Microns |
|---|---|
| 15% of the particles were smaller than | 5 |
| 20% of the particles were between | 5 and 10 |
| 42% of the particles were between | 10 and 20 |
| 23% of the particles were between | 20 and 50 |

The appearance of our new product is that of small semi-transparent, glassy, solid crystal masses of irregular shape and having rounded corners, resembling somewhat that of sintered or semi-fused granules, as compared to the agglomerated granules or clusters of tiny sharp cornered crystals and broken or crushed fine particles of monocalcium phosphate produced in the normal process where the product is dried and subsequently milled. The product of the spray drying process on the other hand comprises spherical particles, some hollow and some solid, of shell-like construction with an internal dendritic crystalline structure.

As shown in the figures given, the new material is practically free from very fine dust. The following table shows the comparative distribution of the old dry-milled product and the present product.

| | Dry-milled particles by weight | Present product particles by weight |
|---|---|---|
| On 60 mesh | T. | |
| On 80 mesh | 0–1% | |
| On 100 mesh | 1–5% | T. |
| On 200 mesh | 10–30% | 16–29% |
| On 325 mesh | 10–20% | 20–25% |
| Below 325 | 50–65% | 50–70% |

*Particles below 325 mesh*

| | Dry-milled particles | | Present product particles | |
|---|---|---|---|---|
| | By number | By weight | By number | By weight |
| | Percent | Percent | Percent | Percent |
| 20–50 microns | 7 | 81.7 | 23 | 97.5 |
| 10–20 microns | 15 | 15.75 | 42 | 1.4 |
| 5–10 microns | 18 | 2.30 | 20 | .83 |
| Below 5 microns | 60 | .29 | 15 | .022 |

The present product, while having about the same amount of material which will pass a 325 mesh screen, that is, 50–70%, and generally 55–65%, shows an entirely different distribution of this material. Thus the number of particles smaller than 5 microns is less than 15% of the total number of granules which will pass a 325 mesh screen. At the same time the number of particles above 100 mesh is extremely small, whereas in the old material an appreciable number, and a larger percentage by weight of the particles, were in the large sizes. In the present product substantially all of the material, by weight, is larger than 20 microns and smaller than 100 mesh.

The specific gravity by immersion of the present material and the old-dry-milled material are both about 2.21, whereas the spray-dried material has a specific gravity of about 2.00.

The regular dry-milled monocalcium phosphate has a neutralizing value of about 80–82. The present product has a neutralizing value from 80–87%, generally above 84%. The neutralizing value is determined by the number of grams of sodium bicarbonate which 100 grams of the monocalcium phosphate will neutralize.

A hygroscopicity test made by placing 3-gram samples of spray-dried, dry-milled and wet-milled materials in a humidifier at 30° C. and 88% relative humidity for 115 hours showed a gain in weight of 49.4% for the spray-dried material, 22.2% for the dry-milled product, and only 8.0% for the product of the present process. Caking tests were made with the products using 30-gram samples placed in cylindrical filter paper packs one and one-quarter inches in diameter and allowed to stand for 16 hours at 47° C. in a humidifier the air of which was 90% saturated with water vapor. The resulting cakes were then dried in a circulating air oven at 85° C. for 6 hours, cooled, and the filter paper packs removed. The cakes were then dressed off to present smooth top and bottom surfaces and a uniform height of one and one-eighth inch for each cylinder. The cake hardness was then determined by crushing the cylinders and noting the relative pressures required. The spray-dried material required 8.8 kg., and dry-milled product 12.6 kg., and the present material only 3.9 kg.

The present product flows far more readily than the dry-milled product and also screens faster and better than the dry-milled product. The present product when used in baking, for example, in waffle or pancake batters, in which the baking acid comprises a mixture of 75% sodium acid pyrophosphate and 25% monocalcium phosphate, gives a batter of excellent consistency, whereas the batter resulting from the use of spray-dried monocalcium phosphate is relatively stiff. Both the spray-dried monocalcium phosphate and the new product are faster reacting in biscuit doughs than the "dry-milled" product and give a more lively dough from which a greater number of biscuits can be cut.

The foregoing detailed description is made for clearness of understanding only, and no unnecessary limitations should be understood therefrom, but the appended claims should be construed as broadly as permissible in view of the prior art.

What we regard as new and desire to secure by Letters Patent is:

1. As an article of commerce suitable for incorporation in leavening agents as a baking acid, irregularly shaped, round-cornered solid crystalline masses of monocalcium phosphate substantially free-flowing and non-caking in character, and substantially all of the individual particles of which will pass through a one hundred mesh screen.

2. An article as set forth in claim 1, in which substantially all of the particles by weight are greater than twenty microns in diameter.

3. As an article of commerce suitable for incorporation in leavening agents as a baking acid, irregularly shaped, round-cornered solid crystalline masses of monocalcium phosphate substantially free-flowing and non-caking in character, substantially all of the individual particles of which will pass through a one hundred mesh screen, in which the major portion of the product will pass a 325-mesh screen, and in which substantially all of the particles by weight are more than twenty-microns in diameter.

4. A product as set forth in claim 3, in which less than fifteen percent of the total number of particles passing a 325 mesh screen are below five microns in diameter.

5. The process of producing a monocalcium phosphate which comprises reacting a lime base with strong phosphoric acid of at least 45° Bé. gravity strength, agitating the reaction mixture to produce a damp hot friable lumpy mass containing approximately 5–12% moisture, mechanically disintegrating the hot mass without substantial drying to produce fine particles substantially all of which will pass through a 100 mesh screen, separating the fine particles while still damp, and drying them, whereby a substantially free-flowing, non-caking, round-cornered, irregularly shaped, solid, crystalline-formed monocalcium phosphate is produced.

6. The process of producing a monocalcium phosphate which comprises reacting a lime base with strong phosphoric acid of at least 45° Bé. gravity strength, agitating the reaction mixture to produce a damp hot friable lumpy mass containing approximately 8–12% moisture, mechanically disintegrating the hot mass without substantial drying to produce fine particles substantially all of which will pass through a 100 mesh screen, separating the fine particles while still damp, and drying them, whereby a substantially free-flowing, non-caking, round-cornered, irregularly shaped, solid, crystalline-formed monocalcium phosphate is produced.

7. The process of producing a monocalcium phosphate which comprises reacting a lime base with strong phosphoric acid of 50–55° Bé. gravity strength, agitating the reaction mixture to produce a damp hot friable lumpy mass containing approximately 8–12% moisture, mechanically disintegrating the hot mass without substantial drying to produce fine particles substantially all of which will pass through a 100 mesh screen, separating the fine particles while still damp, and drying them, whereby a substantially free-flowing, non-caking, round-cornered, irregularly shaped, solid, crystalline-formed monocalcium phosphate is produced.

8. The method as set forth in claim 6, in which the moist mass has a temperature of 70–120° C. when disintegrated, and in which the disintegration is carried out in an atmosphere at least 85% saturated with moisture.

9. The method as set forth in claim 6, in which the fine particles are dried to a free moisture content below .5% in a current of air heated to 200–300° C., regulated in volume and velocity so as not to cause local dehydration of the crystalline monocalcium phosphate.

WILLIAM H. KNOX, Jr.
ROBERT T. COCHRAN.